March 4, 1969 A. K. PANDJIRIS ET AL 3,430,944
HEAD AND TAILSTOCK MANIPULATOR
Filed April 5, 1967 Sheet 2 of 3
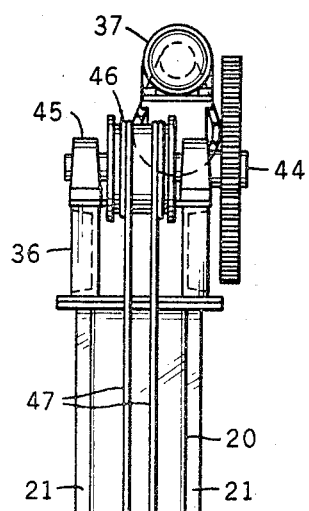
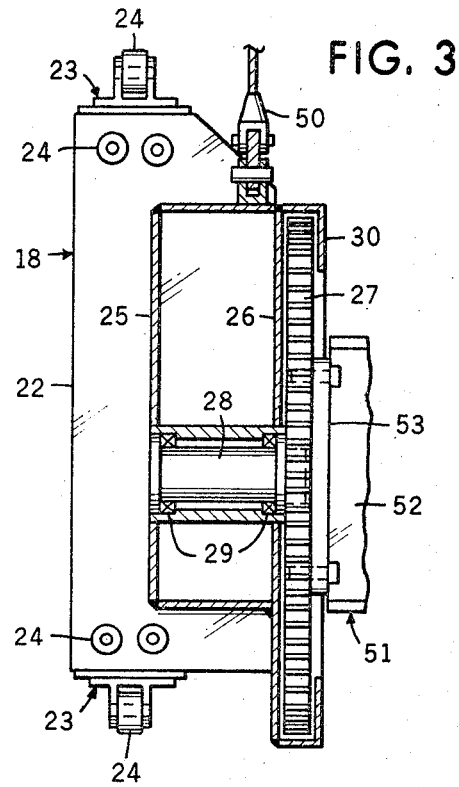
FIG. 2
FIG. 3
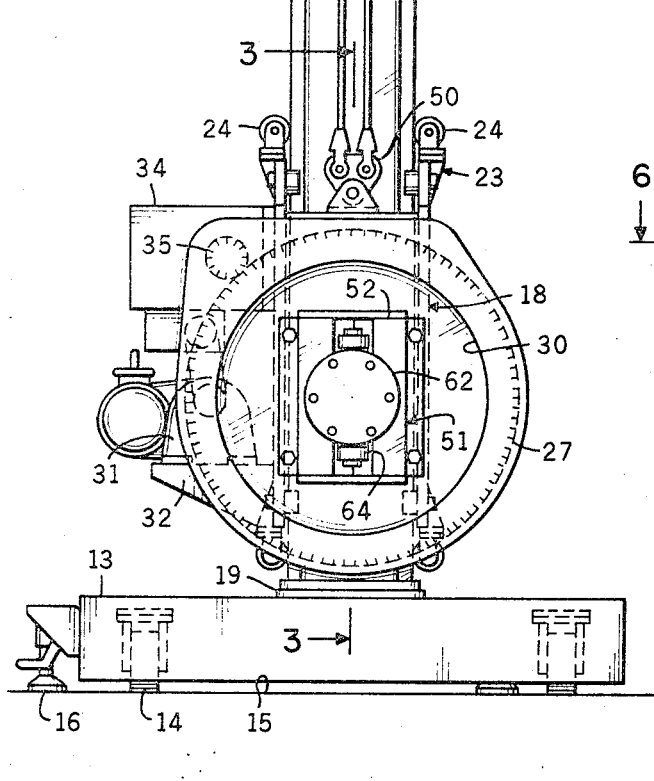
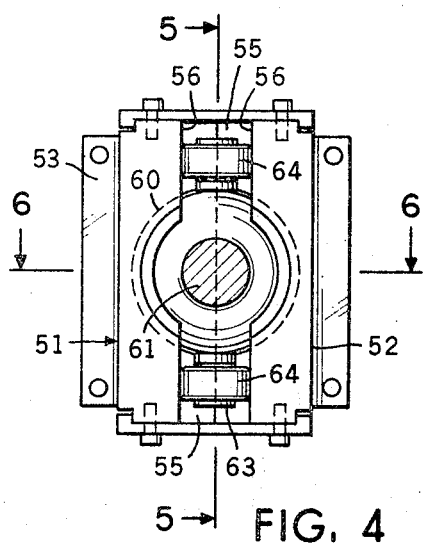
FIG. 4
INVENTORS
ANTHONY K. PANDJIRIS
ARTHUR I. FREDERICK
BY Cohn and Powell
ATTORNEYS

INVENTORS
ANTHONY K. PANDJIRIS
ARTHUR I. FREDERICK

BY Cohn and Powell
ATTORNEYS

United States Patent Office 3,430,944
Patented Mar. 4, 1969

3,430,944
HEAD AND TAILSTOCK MANIPULATOR
Anthony K. Pandjiris, St. Louis, and Arthur I. Frederick, Webster Groves, Mo., assignors to The Pandjiris Weldment Co., St. Louis, Mo., a corporation of Missouri
Filed Apr. 5, 1967, Ser. No. 628,586
U.S. Cl. 269—61      13 Claims
Int. Cl. B23q *3/18*

ABSTRACT OF THE DISCLOSURE

A pair of universal couplings support a workpiece therebetween in any preselected horizontal or inclined position by adjustment of the heights of crossheads reciprocatively mounted on associated columns of cooperathead and tailstock units, the workpiece being rotated through the universal couplings in any adjusted position. At least one unit is movable relative to the other unit to adjust the horizontal spacing between and any lateral misalignment of the universal couplings as the workpiece position is adjusted by selective height adjustment of the crossheads and upon rotation of the workpiece by the universal couplings.

Background of the invention

This invention relates generally to improvements in a head and tailstock manipulator especially adapted for positioning and turning workpiece during welding operations, and more particularly to means for automatically positioning and aligning the head and tailstock units during selective adjustment of the workpiece position between the units and during rotation of the workpiece.

Various types of positioners, such as turn-tables and turning rolls, for example, have been utilized to rotate workpieces during welding. It is advantageous to adjust the angular position and height of an elongate workpiece to facilitate welding procedures on a specific workpiece. Difficulties have been encountered in positioners which support and turn the workpiece at opposite ends, because the workpiece must be turned at different angles and heights, and because the spacing and alignment of the supporting units must be adjusted to accommodate the different preselected angles and heights.

Summary of the invention

A manipulator for positioning and turning a workpiece during welding in which the headstock unit and the tailstock unit each includes a universal coupling rotatively mounted on and carried by a crosshead reciprocatively mounted on a column, the universal couplings supporting the workpiece therebetween in a horizontal or inclined position by adjustment of the heights of the crossheads on the associated columns, and rotating the workpiece in any adjusted position.

The bases of the head and tailstock units are relatively movable to adjust the spacing between the universal couplings as the position of the workpiece is adjusted by selective height adjustment of the crossheads.

At least one column of the headstock and tailstock units can be pivotally mounted on its associated base so that its crosshead and universal coupling can be turned, and at least one of the units is movable relative to the other unit to adjust the spacing between and to correct any misalignment of the universal couplings.

Each crosshead includes a rotatively mounted wheel, the wheels being arranged in facing relation. A drive means is carried by the crosshead of the headstock unit and is operatively connected to its wheel for rotating the wheel. The wheel of the crosshead mounted on the tailstock unit is freely rotatable as an idler. The universal couplings are fixed to and rotatable with the wheels of the units.

Each universal coupling includes a journal box fixed to its associated wheel, the box having a substantially spherical socket, the center of which is located on the rotative axis of the wheel. In addition, the universal coupling includes a stub shaft having a substantially spherical knuckle universally mounted in the socket, the shaft being adapted for attachment to one end of the workpiece.

The universal coupling associated with the headstock unit includes a guideway in the box communicating with the socket and extending generally in the direction of the rotative axis of the wheel, and a torque arm fixed to and extending outwardly of the knuckle into bearing engagement laterally with the guideway.

The wheel of the headstock unit is provided by a gear operatively connected to and driven by a power means carried by the crosshead of the headstock unit, the power means rotating the gear and the associated universal coupling.

At least one of the units is movable relative to the other unit to adjust the horizontal spacing between and any lateral misalignment of the universal couplings as the position of the workpiece is adjusted by a selective height adjustment of the crossheads and upon rotation of the workpiece by the universal couplings.

Brief description of the drawings

FIG. 2 is a front elevational view of the headstock unit shown in FIG. 1;
FIG. 3 is an enlarged, cross-sectional view taken on line 3—3 of FIG. 2;
FIG. 4 is an enlarged view of the universal coupling taken on line 4—4 of FIG. 1;
FIG. 5 is a cross-sectional view of the universal coupling taken on line 5—5 of FIG. 4;
FIG. 6 is a cross-sectional view taken on line 6—6 of FIG. 4.

Description of the preferred embodiment

Figure 1:
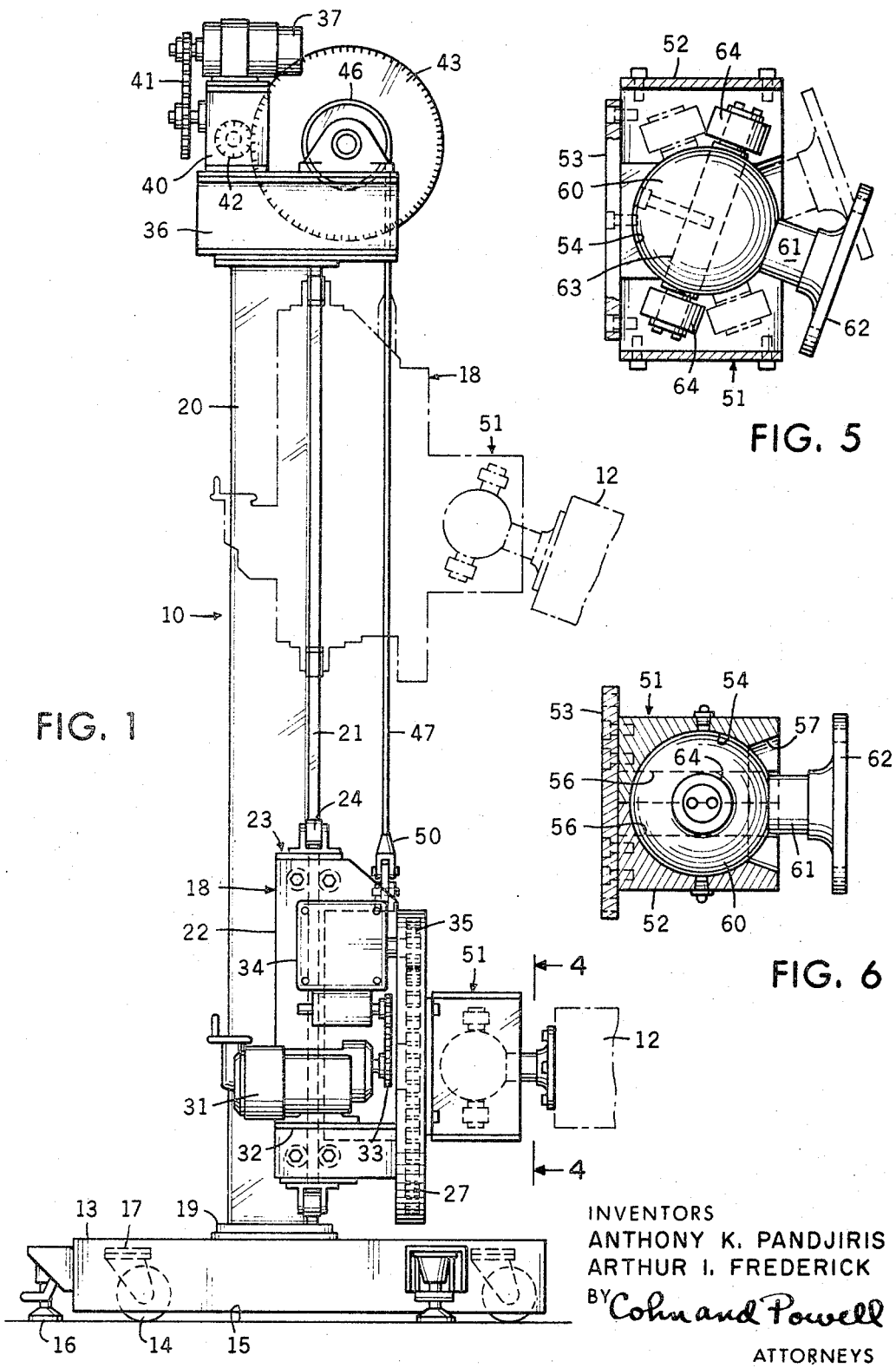
FIG. 1 is a side elevational view of the headstock unit.

Referring now by characters of reference to the drawings, and first to FIGS. 1 and 2, it will be understood that the manipulator includes a headstock unit generally indicated by 10 having a base 13 mounted on rollers 14, and constituting a truck, to facilitate movement along a supporting surface such as a floor 15. The base 13 is provided with a plurality of retractable feet 16 seating on the supporting surface 15 and operatively removing the rollers 14 from effective engagement with the supporting surface 15, the feet 16 anchoring the base 13 in a predetermined location. As is usual, the feet 16 can be selectively retracted so that the rollers 15 will effectively engage the supporting surface 15 to facilitate movement and repositioning of the headstock unit 10.

The rollers 14 can be mounted on swivel brackets 17 so that the headstock unit 10 can be selectively moved in any direction. In some instances, the rollers 14 can be mounted on a track (not shown) so that movement of the headstock unit 10 is in a predetermined path as determined by the interengagement of the rollers 14 on such track.

Mounted on and extending upwardly from the base 13 is a substantially vertical column 20. In some instances, the column 20 is attached to the base 13 by a pivot mounting 19 for turning about a substantially vertical axis. Extending upwardly along each side of column 20 is an elongate crosshead track 21.

A crosshead referred to by 18 includes a frame 22 located in front of and on each side of the column 20. A pair of guide assemblies generally indicated by 23 are carried by each side of the frame 22, one assembly 23 being located at the top while the other assembly is located at the bottom. Each of the guide assemblies 23 includes a plurality of rollers 24 engaging the top surface and opposed side surfaces comprising the associated guide track 21. The coaction of the guide assemblies 23 with their associated tracks 21 constrain the movement of the crosshead 18 to a vertical, reciprocative movement along the column 20.

As is best shown in FIG. 3, the crosshead frame 22 includes a housing 25 having a forwardly facing front plate 26. A large gear 27, constituting a wheel, is located adjacent to and forwardly of the housing plate 26 and is rotatively mounted by a stub shaft 28 journaled in bearings 29 within housing 25. The housing 25 includes an inturned rim 30 located peripherally about the gear 27 so as to provide a shield about the gear teeth.

The power means for driving the gear 27 includes an electric motor 31 mounted on a bracket 32 carried by the cross head frame 22. The motor 31, acting through a suitable chain and sprocket drive 33 and a gear reducer 34, also mounted on and carried by the crosshead frame 22, operates to turn a drive pinion 35. The drive pinion 35 is disposed in front of the housing plate 26 and within the inturned rim 30, and meshes with the gear 27 to rotate the gear 27 at predetermined speeds.

As is usual, a platform 36 is attached to the top of the column 20 and serves to mount the crosshead-positioning mechanism. This mechanism includes an electric motor 37 and a gear reducer 40 operatively interconnected by a chain and sprocket drive 41. A drive pinion 42 on the outlet shaft of the gear reducer 40 meshes with a gear 43 keyed to one end of a cross-shaft 44 mounted on spaced journals 45. Keyed to the cross-shaft 44 and located between the spaced journals 45, is a winch pulley 46 to which the cables 47 are attached and about which the cables 47 are wrapped. The lower ends of the cables 47 are attached to the top of a crosshead frame 22 by pivotally interconnected brackets 50.

Upon actuation of the motor 37, the winch pulley 46 will be turned and in the desired direction and at a predetermined speed to lift or lower the crosshead 18.

Attached to and rotatable with the gear 27 is a universal coupling referred to by 51. The detailed construction of the universal coupling 51 is perhaps best illustrated in FIGS. 4, 5 and 6. The universal coupling 51 includes a journal box 52 attached to the front surface of the gear 27 by a back plate 53. Formed within the journal box 52 is a spherical socket 54, the center of which is located on the rotational axis of gear 27. Formed within the journal box 52 and communicating with opposite sides of the socket 54 are a pair of guideways 55, each guideway 55 being defined by a pair of opposed, parallel bearing surfaces 56. For reasons that will later appear, the journal box 52 is provided with a conical front opening 57 communicating with the spherical socket 54.

Rotatively mounted within the spherical socket 54 is a compatible spherical knuckle 60. A stub shaft 61 is attached to the knuckle 60 and extends through the conical front opening 57 outwardly of the journal box 52. A coupling plate 62 is attached to and carried by the outer end of stub shaft 61.

Extending through the center of knuckle 60 at right angles to the longitudinal axis of stub shaft 61 is a transverse shaft 63, constituting a pair of torque arms. Rotatively mounted at each end of the transverse shaft 63 is a roller 64 located in an associated guideway 55 and engaging one of the opposed bearing surfaces 56 defining such guideway 55.

Upon rotation of the gear 27, the journal box 52 will be turned in the corresponding direction. As the journal box 52 rotates, one of the bearing surfaces 56 of each guideway 55 engages the associated roller 64 and causes a corresponding rotation of the knuckle 60 and its stub shaft 61 about the rotational axis of the gear 27. In the event that the longitudinal axis of the stub shaft 61 is angularly related to the rotational axis of the gear 27 and journal box 52, the rollers 64 will roll on their coacting bearing surfaces 57 in an oscillating movement as the spherical knuckle 60 universally swivels in its socket 54 and the stub shaft 61 moves in a conical path within the conical front opening 57. Therefore, the coupling plate 62 and its attached workpiece 12 will be rotated in any angular position within the limits determined by the angle of the conical front opening 57 and the extent of rolling movement of rollers 64 on bearing surfaces 56.

Figure 8:
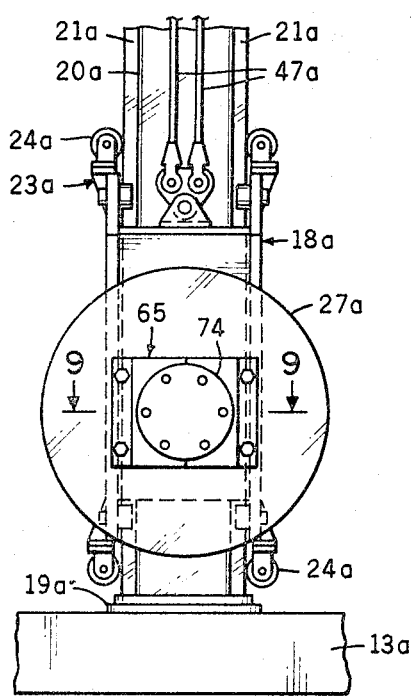
FIG. 8 is a fragmentary, front elevational view of the tailstock unit shown in FIG. 7.
Figure 7:
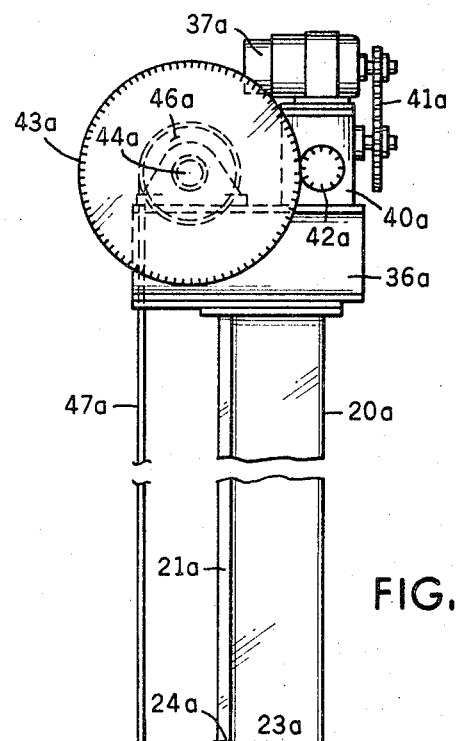
FIG. 7 is an elevational view of the tailstock unit.
Figure 9:
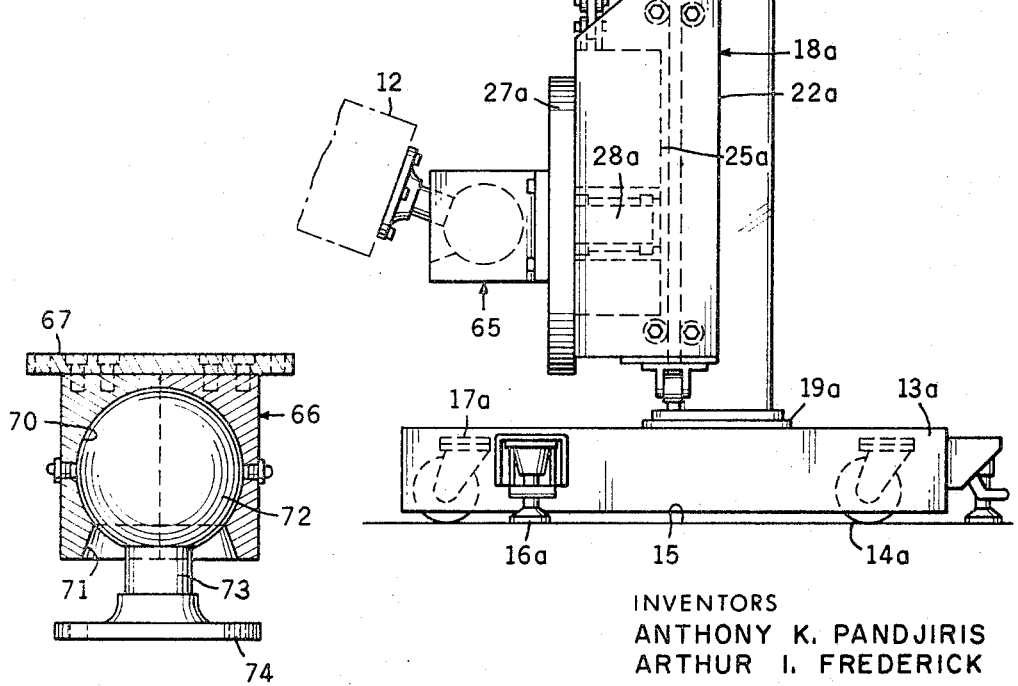
FIG. 9 is an enlarged, cross-sectional view of the universal coupling taken on line 9—9 of FIG. 8.

The tailstock unit referred to by 11 is best illustrated in FIGS. 7 and 8. Because the basic component parts of the tailstock unit 11 is the same as the headstock unit 10 previously described, corresponding reference numerals will be utilized wherever possible but will distinguish by the use of the suffix letter *a*.

For example, the tailstock unit 11 includes a base 13*a* mounted on rollers 14*a*. Retractable feet 16*a* can be selectively positioned to raise the rollers 14*a* off the ground 15 in order to anchor the tailstock unit 11 or to lower the rollers 14*a* on the ground 15 in order that the tailstock unit 11 can be selectively repositioned with respect to its associated and coacting headstock unit 10. The rollers 14*a* can be mounted on swivel brackets 17*a* if desired. Of course, it will be understood that the rollers 14*a* can be mounted on a track (not shown) which would define the path of travel of the tailstock unit 11.

A vertical column 20*a* is mounted on the base 13*a*. In some instances it is desirable to have the column 20*a* turn about its vertical axis, and therefore, the column 20*a* can be mounted to the base 13*a* by a suitable pivot mounting 19*a*. Attached to and mounted on each side of the vertical column 20*a* is a longitudinal, vertical guide track 21*a*.

Reciprocatively mounted on column 20*a* is a crosshead generally indicated by 18*a*. The crosshead 18*a* includes a frame 22*a* located in front and on each side of the column 20*a*. Guide assemblies 23*a* are carried by each side of the crosshead frame 22*a* and include guide rollers 24*a* engaging the associated tracks 21*a*.

The crosshead frame 22*a* includes a housing 25*a* which rotatively mounts a relatively large wheel 27*a* on a shaft 28*a*. The wheel 27*a* mounts a universal coupling referred to by 65 and later described in detail.

The mechanism for positioning the crosshead 18*a* on the tailstock unit 11 includes a motor 37*a* and a gear reducer 40*a* mounted on a platform 36*a* at the top of column 20*a*. The motor 37*a* and gear reducer 40*a* are operatively interconnected by a chain and sprocket drive 41*a*. A drive pinion 42*a* at the outlet of the gear reducer 40*a* operatively meshes with a large gear 43*a* mounted on a transverse shaft 44*a*. A winch pulley 46*a* is mounted on and rotatable with the transverse shaft 44*a*. Lifting cables 47*a* have one end attached to the winch pulley 46*a* and have the other end attached to the crosshead frame 22*a* by pivotally connected brackets 50*a*.

Actuation of the motor 37*a* causes rotation of the winch pulley 46*a* in the desired direction and causes selectively a raising or lowering of the crosshead 18*a* on the column 20*a*.

The universal coupling 65 includes a journal box 66 attached by a back plate 67 to the front surface of the wheel 27*a*. The journal box 66 is provided with an internal spherical socket 70 and is provided with a conical front opening 71 communicating with the socket 70. Rotatively mounted within the socket 70 is a compatible spherical knuckle 72, the center of which is on the rotational axis of wheel 27*a* and shaft 28*a*. A stub shaft 73 is attached to and rotatable with the knuckle 72, the shaft 73 extending outwardly of the journal box 66 through the conical front opening 71. Attached to the outer end of the stub shaft 73 is a coupling plate 74 adapted to be attached to the end of the workpiece 12.

Upon rotation of the workpiece 12 attached to the coupling plate 74, the spherical knuckle 72 will be turned simultaneously. Because of the frictional bearing of the knuckle 72 within the socket 70, the knuckle 72 will cause the journal box 66 to rotate, together with its attached wheel 27a, on the rotational axis of shaft 28a. If the knuckle shaft 73 is angularly related to the rotational axis of shaft 28a, the stub shaft 73 will move in a conical path within the conical front opening 71 as the knuckle 72 universally swivels slightly withni its socket 70. In order to reduce friction, there is little or no relative rotational movement between the spherical knuckle 72 and the journal box 66, the rotational movement of the workpiece 12 being transmited by the universal coupling to the wheel 27a and its shaft 28a.

It is thought that the functional advantages of the head and tailstock manipulator 10 and 11 have become apparent from the foregoing detailed description of parts, but for completeness of disclosure, the operation will be briefly described. It will be assumed that a workpiece 12 has been located between the head and tailstock units 10 and 11 and has been attached to the coupling plates 62 and 74 respectively of the universal couplings 51 and 65. The workpiece 12 is positioned in the appropriate angular relationship for welding operation by raising or lowernig either one or both of the crossheads 18 and 18a. In order to permit such angular adjustment of the workpiece 12 between the head and tailstock units 10 and 11, either one or both of the head and tailstock units are conditioned for rolling movement on the supporting floor 15. For example, when the workpiece 12 is substantially horizontal and the crossheads 18 and 18a are located at substantially the same height, the head and tailstock units 10 and 11 are located at their greatest relative distance apart for such workpiece 12. If the crosshead 18 were raised or lowered to place the workpiece 12 at an angle, the tail and headstock units 10 and 11 must move relatively closer to accommodate this angular position of the workpiece 12.

Consequently, it will be understood that at least one unit is movable relative to the other unit to adjust the horizontal spacing between and any lateral misalignment of the universal couplings 51 and 65 as the workpiece position is adjusted by selective height adjustment of the crossheads 18 and 18a.

Under some circumstances, the head and tailstock units 10 and 11 will be laterally misaligned. In such event, it may be desirable to have the columns 20 and 20a movable about their relative vertical axes and/or have either one or both of the units 10 and 11 freely movable to adjust for any lateral misalignment of the universal couplings 51 and 65 upon rotation of the workpiece 12 by the universal couplings.

Upon energization of motor 31, the gear 27 will rotate the journal box 52 of the universal coupling 51, and thereby cause a corresponding rotation of the spherical knuckle 60 and of the workpiece 12. The wheel 27a on the tailstock unit 11 will rotate to permit returning of the workpiece 12 and the coacting universal coupling 65. As explained previously, the action of the spherical knuckles 60 and 72 within their compatible sockets 54 and 70 respectively will compensate for any angular disposition of the workpiece 12 during turning action.

If desired, the angular position of the workpiece 12 can be readjusted upon selective height adjustment of the crossheads 18 and 18a during the act of turning the workpiece 12. In such event, either one or both of the head and tailstock units 10 and 11 must be free to move relative to each other so as to adjust the distance therebetween and thereby accommodate the change in angular position of the workpiece 12.

Although the invention has been described by making detailed reference to a single preferred embodiment, such detail is to be understood in an instructive, rather than in any restrictive sense, many variants being possible within the scope of the claims hereunto appended.

We claim as our invention:

1. In a head and tailstock manipulator for positioning and turning a workpiece during welding, the improvement comprising:
    (a) a headstock unit including a universal coupling,
    (b) a tailstock unit including a universal coupling,
    (c) one of said units providing means for raising and lowering the universal coupling of said one unit relative to the universal coupling of the other unit, the universal couplings supporting a workpiece therebetween in a horizontal or inclined position by adjustment of the relative heights of the universal couplings on the headstock and tailstock units, and
    (d) drive means on one of said units for rotating the associated universal coupling of said unit, whereby to rotate the workpiece in any adjusted position.

2. A head and tailstock manipulator as definied in claim 1, in which:
    (e) the headstock unit and tailstock unit include bases relatively movable to adjust the spacing between the universal couplings as the positions of the workpiece is adjusted.

3. In a head and tailstock manipulator for positioning and turning a workpiece during welding, the improvement comprising:
    (a) a headstock unit including:
        (1) a base,
        (2) a column mounted on and carried by the base,
        (3) a crosshead reciprocatively mounted on the column,
        (4) a universal coupling mounted on and carried by the crosshead, and
        (5) drive means rotating the universal coupling,
    (b) a tailstock unit including:
        (1) a base,
        (2) a column mounted on and carried by the base,
        (3) a crosshead reciprocatively mounted on the column, and
        (4) a universal coupling rotatively mounted on and carried by the crosshead, and
    (c) the universal couplings supporting a workpiece therebetween in a horizontal or inclined position by adjustment of the heights of the crossheads on the associated columns, the workpiece being rotated through the universal couplings in any adjusted position.

4. In a head and tailstock manipulator as defined in claim 3, in which:
    (d) the bases of the head and tailstock units are relatively movable to adjust the spacing between the universal couplings as the position of the workpiece is adjusted.

5. In a head and tailstock manipulator as defined in claim 3, in which:
    (d) the bases of the head and tailstock units are relatively movable to adjust the spacing between and the alignment of the universal couplings as the position of the workpiece is adjusted by selective height adjustment of the crossheads.

6. A head and tailstock manipulator as defined in claim 3, in which:
    (d) at least one column is pivotally mounted on its associated base so that its crosshead and universal coupling can be turned, and
    (e) at least one unit is movable relative to the other unit to adjust the spacing between and to correct any misalignment of the universal couplings.

7. A head and tailstock manipulator as defined in claim 3, in which:
    (d) the crosshead of the headstock unit includes a rotatively mounted wheel, (e) means is carried by the crosshead of the headstock unit and is operatively connected to its associated wheel for rotating the wheel, and (f) the universal coupling of the headstock unit is fixed to and rotatable with the wheel.

8. A head and tailstock manipulator as defined in claim 3, in which:

(d) each crosshead includes a rotatively mounted wheel, the wheels being arranged in facing relation, (e) means is carried by the crosshead of the headstock unit and is operatively connected to its associated wheels for rotating the wheel, (f) the wheel of the crosshead mounted on the tailstock unit is freely rotatable as an idler, and (g) the universal couplings are fixed to and rotatable with the wheels of the units.

9. A head and tailstock manipulator as defined in claim 8, in which which:

(h) each universal coupling includes:

(1) a journal box fixed to its associated wheel, the box having a substantially spherical socket, the center of which is located on the rotative axis of the wheel, and (2) a stub shaft having a substantially spherical knuckle universally mounted in the socket, the shaft being adapted for attachment to one end of the workpiece, and (i) the universal coupling associated with the headstock unit includes:

(1) a guideway in the box communicating with the socket and extending generally in the direction of the rotative axis of the wheel, and (2) a torque arm fixed to and extending outwardly of the knuckle into bearing engagement laterally with the guideway.

10. A head and tailstock manipulator as defined in claim 9, in which:

(j) a guideway is disposed on opposite sides of the universal coupling associated with the headstock unit, each guideway being bounded by opposed bearing surfaces, and (k) a pair of torque arms extend radially outward from opposite sides of the knuckle, each torque arm having a roller riding on one of the opposed bearing surfaces of the associated guideways.

11. A head and tailstock manipulator as defined in claim 8, in which:

(h) the wheel of the headstock unit is a gear, and (i) power means is carried by the crosshead of the headstock unit and is operatively connected to the gear for rotation of the gear and associated universal coupling.

12. A head and tailstock manipulator as defined in claim 3, in which:

(d) at least one unit is movable relative to the other unit to adjust the horizontal spacing between and any lateral misalignment of the universal couplings as the position of the workpiece is adjusted by selective height adjustment of the crossheads and upon rotation of the workpiece by the universal couplings.

13. A head and tailstock manipulator as defined in claim 3, in which:

(d) at least one unit is movable relative to the other unit to adjust the horizontal spacing between and any lateral misalignment of the universal couplings as the position of the workpiece is adjusted by selective height adjustment of the crossheads and upon rotation of the workpiece, (e) each crosshead includes a rotatively mounted wheel, the wheels being arranged in facing relation, (f) the wheel of the headstock unit is a gear, (g) power means is carried by the crosshead of the headstock unit and is operatively connected to the gear for rotation of the gear and associated universal coupling, (h) the wheel of the crosshead mounted on the tailstock unit is freely rotatable as an idler, (i) the universal couplings are affixed to and rotatable with the wheels of the units, (j) each universal coupling includes:

(1) a journal box fixed to its associated wheel, the box having a substantially spherical socket, the center of which is located on the rotative axis of the wheel, and (2) a stub shaft having a substantially spherical knuckle universally mounted in the socket, the shaft being adapted for attachment to one end of the workpiece, (k) the universal coupling associated with the headstock unit includes:

(1) a guideway disposed on opposite sides of and communicating with the socket and extending generally in the direction of the rotative axis of the wheel, and (2) a pair of torque arms fixed to and extending radially outward from opposite sides of the knuckle, each torque arm having a roller riding on one of the opposed bearing surfaces of the associated guideway.

References Cited

UNITED STATES PATENTS

| | | | |
|---|---|---|---|
| 2,931,644 | 5/1960 | Kenworthy | 269—61 X |
| 2,997,292 | 8/1961 | Lucker | 269—60 X |
| 3,063,706 | 11/1962 | Thurstone | 269—61 |

ROBERT C. RIORDON, *Primary Examiner.*

D. R. MELTON, *Assistant Examiner.*